No. 788,783. Patented May 2, 1905.

UNITED STATES PATENT OFFICE.

WILLIAM MAASCH, OF NEW YORK, N. Y., ASSIGNOR OF ONE-TENTH TO VITAL BESSIER, OF BROOKLYN, NEW YORK.

WATERPROOF COMPOSITION.

SPECIFICATION forming part of Letters Patent No. 788,783, dated May 2, 1905.

Application filed September 24, 1904. Serial No. 225,788.

*To all whom it may concern:*

Be it known that I, WILLIAM MAASCH, a citizen of the United States, residing at New York city, Brooklyn, county of Kings, and State of New York, have invented new and useful Improvements in Waterproof Compositions, of which the following is a specification.

This invention relates to a waterproof composition which may be utilized for waterproofing textile fabrics, wood, and other substances.

The composition consists of the following ingredients: two parts, by weight, of slaked lime; six parts, by weight, of pot-cheese; four parts, by weight, of white lead.

The slaked lime is finely divided and is mixed with the pot-cheese, after which the white lead is added. The mixture is spread while fresh over one or both sides of canvas, which is then dried. The coated canvas may be used as a covering for life-preservers or for awnings, tents, and other purposes and may be protected by an additional coat of white-lead paint.

To waterproof wood, the latter is steeped into the composition and heated to about 125° Fahrenheit.

What I claim is—

A waterproof composition consisting of slaked lime, pot-cheese, and white lead, substantially as specified.

Signed by me at New York city, (Manhattan,) New York, this 23d day of September, 1904.

WILLIAM MAASCH.

Witnesses:
 WILLIAM SCHULZ,
 FRANK V. BRIESEN.